United States Patent [19]

Penrose et al.

[11] Patent Number: 5,685,762

[45] Date of Patent: Nov. 11, 1997

[54] DE-BOXING APPARATUS FOR HONEY FRAMES

[75] Inventors: David F. Penrose, Christchurch, New Zealand; Roland A. Hitchcox, deceased, late of Timaru, New Zealand, by Vera M. Hitchcox, Wynne A. Raymond, administrators; Neil M. Hitchcox, Timaru, New Zealand

[73] Assignee: David Frederick Penrose, Christchurch, New Zealand

[21] Appl. No.: 496,196

[22] Filed: Jun. 28, 1995

[51] Int. Cl.⁶ .................................................. A01K 59/00
[52] U.S. Cl. .................................................. 449/51

[58] Field of Search .................... 449/51, 56, 64

[56] References Cited

U.S. PATENT DOCUMENTS

| 4,346,490 | 8/1982 | Katz et al. | 449/2 |
| 4,520,519 | 6/1985 | Kuehl | 449/51 |

*Primary Examiner*—Robert P. Swiatek
*Attorney, Agent, or Firm*—Cushman, Darby & Cushman

[57] ABSTRACT

Apparatus for removing honey frames from their box, in which the frames first are raised with the box and then the frames are pushed out of the box onto supporting brackets.

9 Claims, 6 Drawing Sheets

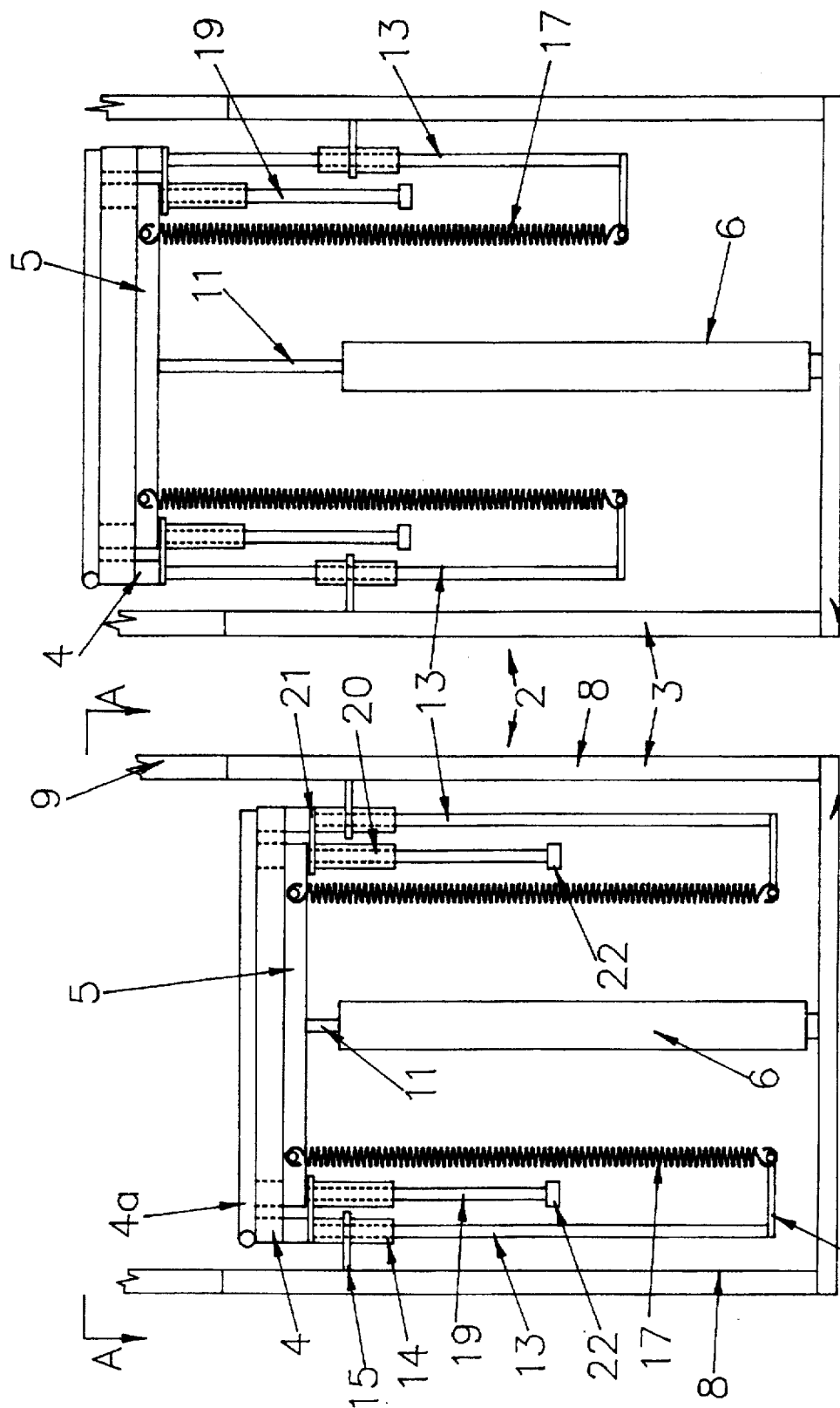

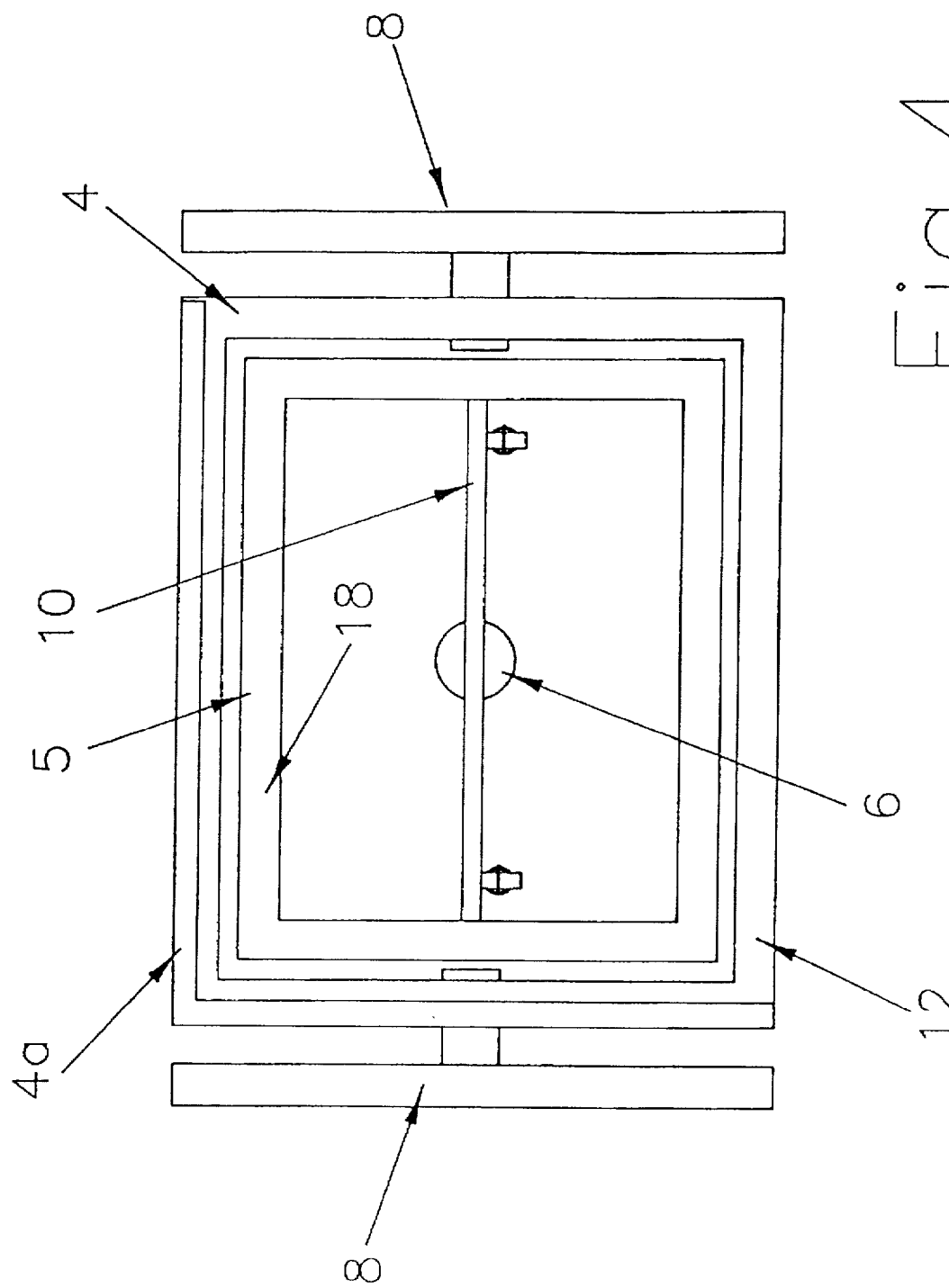

DE-BOXING APPARATUS FOR HONEY FRAMES

BACKGROUND OF THE INVENTION (i) Field of the Invention

The present invention relates to apparatus for lifting boxes full of honey frame and pushing the flames out of the box.

A hive is made up of a series of stacked boxes, each consisting of four rectangular walls secured together to make an open-topped, open-based "box". The boxes are stacked on top of each other, with the walls of the boxes forming the exterior walls of the hive. Honey frames are rectangular wooden frames formed with the outer ends of the upper edge extended outwards to form a lug at each upper corner of the frame. A sheet of wax fills in the frame, to serve as a base for the bees' construction of a honeycomb. When completed, the honeycomb covers both sides of the original starter sheet of wax, and the outer surfaces of the honeycomb bulge outwards from the plane of the frame. These outer surfaces are sealed with a capping of beeswax by the bees. Before honey can be extracted from the honeycomb, this capping has to be removed. Honey flames are supported in sets on each box:- the lug at each end of each frame is supported upon the upper edge of each box, with the plane of the frame vertical. The height of each box is slightly greater than the height of each frame.

When the frames in a hive have been filled with honey, the hive is dismantled by lifting the boxes apart, complete with each box's set of frames. The frames are transported to the processing apparatus still in their boxes.

Before the honey can be processed, each frame must be lifted out of its box.

(ii) Description of the Prior Art

The oldest method of dealing with honey frames is simply to lift the frames manually from their box, one by one, and scrape off the wax capping with a knife. This method still is used by small-scale bee-keepers, but is impractical for large-scale commercial production.

Commercial producers normally use a machine for uncapping honey frames; one of the most widely used machines for this purpose in U.S.A. and Canada is the Cook and Beats Automatic Rotary Cutter Uncapping Machine (hereinafter called a "C & B").

Since boxes of honey frames are heavy, it is common to use a lifting device to raise the frames out of the box to the level of the in-feed of an uncapping machine. A number of machines are known for this purpose, but all known machines lift or push the frames out of their box:- the unsupported frames tend to wobble and need to be steadied and guided by hand, and this makes the de-boxing slower and more labour-intensive than is desirable.

BRIEF SUMMARY OF THE INVENTION

An object of the present invention is to provide apparatus capable of de-boxing honey frames and raising the frames to the in-feed level of a processing machine, with minimum of manual intervention.

The present invention provides: a de-boxing apparatus for honey frames, comprising: a first platform in the form of a frame dimensioned to support the lower periphery of a honey frame box (as hereinbefore defined); means for raising said platform from a first, lower position to a second, raised position which is a predetermined distance below the in-feed level of a honey processing machine; means for pushing the honey frames upwards out of said box as the platform approaches or reaches said second position; the pushing means comprising a second platform arranged to lie within the frame comprising the first platform at said first position and arranged to lie above the first platform when the first platform is at said second position and support means arranged to receive and support said frames when said frames are removed from said box.

BRIEF DESCRIPTION OF THE DRAWINGS

By way of example only, a preferred embodiment of the present invention is described in detail with reference to the accompanying drawings, in which:

FIG. 2 is a partial front view of the apparatus of FIG. 1, in said first position;

FIG. 3 is a partial front view of the apparatus of FIG. 1 in said second position.

FIG. 4 is a plan view in line A—A of FIG. 2;

DETAILED DESCRIPTION OF THE INVENTION

Figure 1:
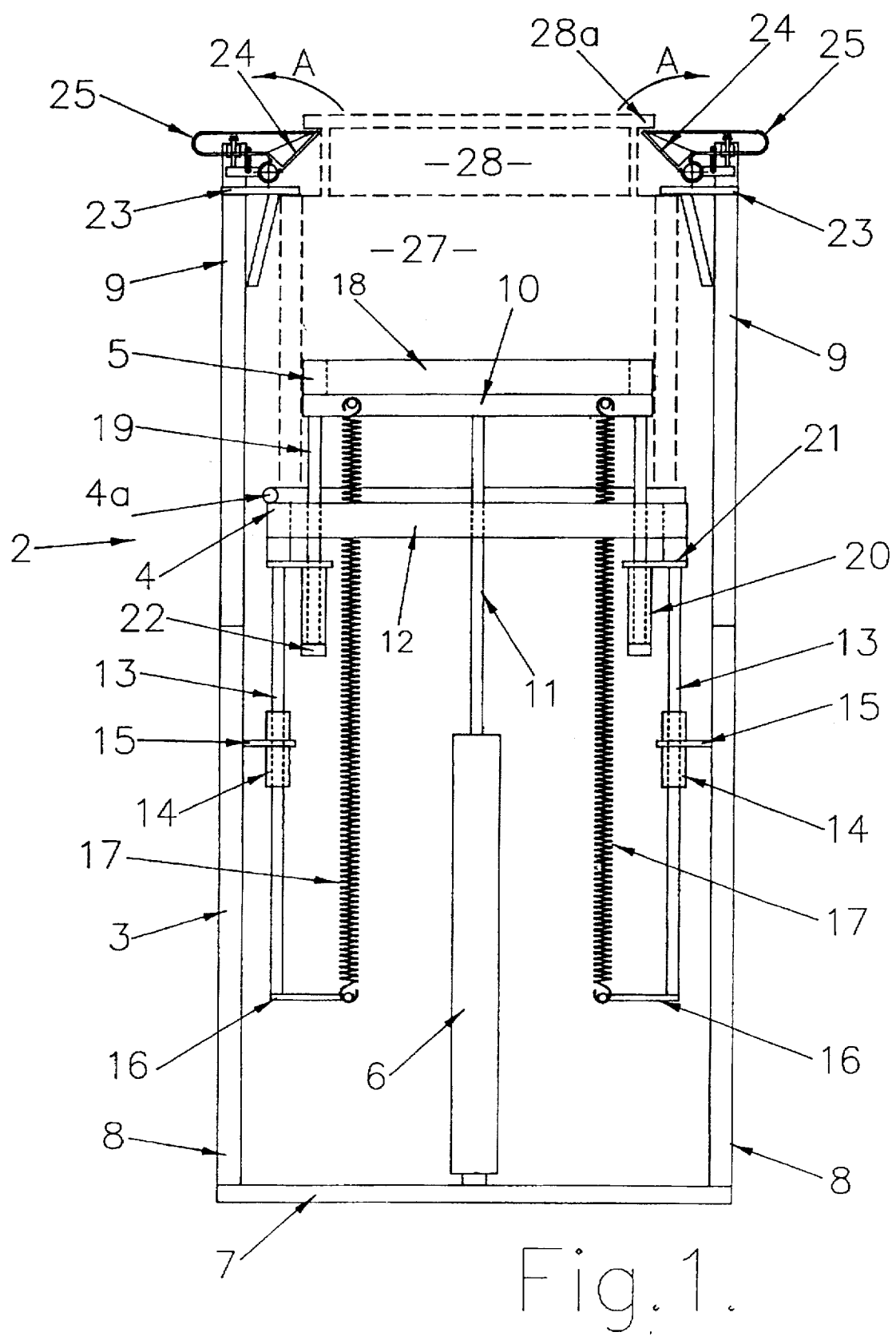
FIG. 1 is a front view of a first embodiment of the present invention.
Figure 5:
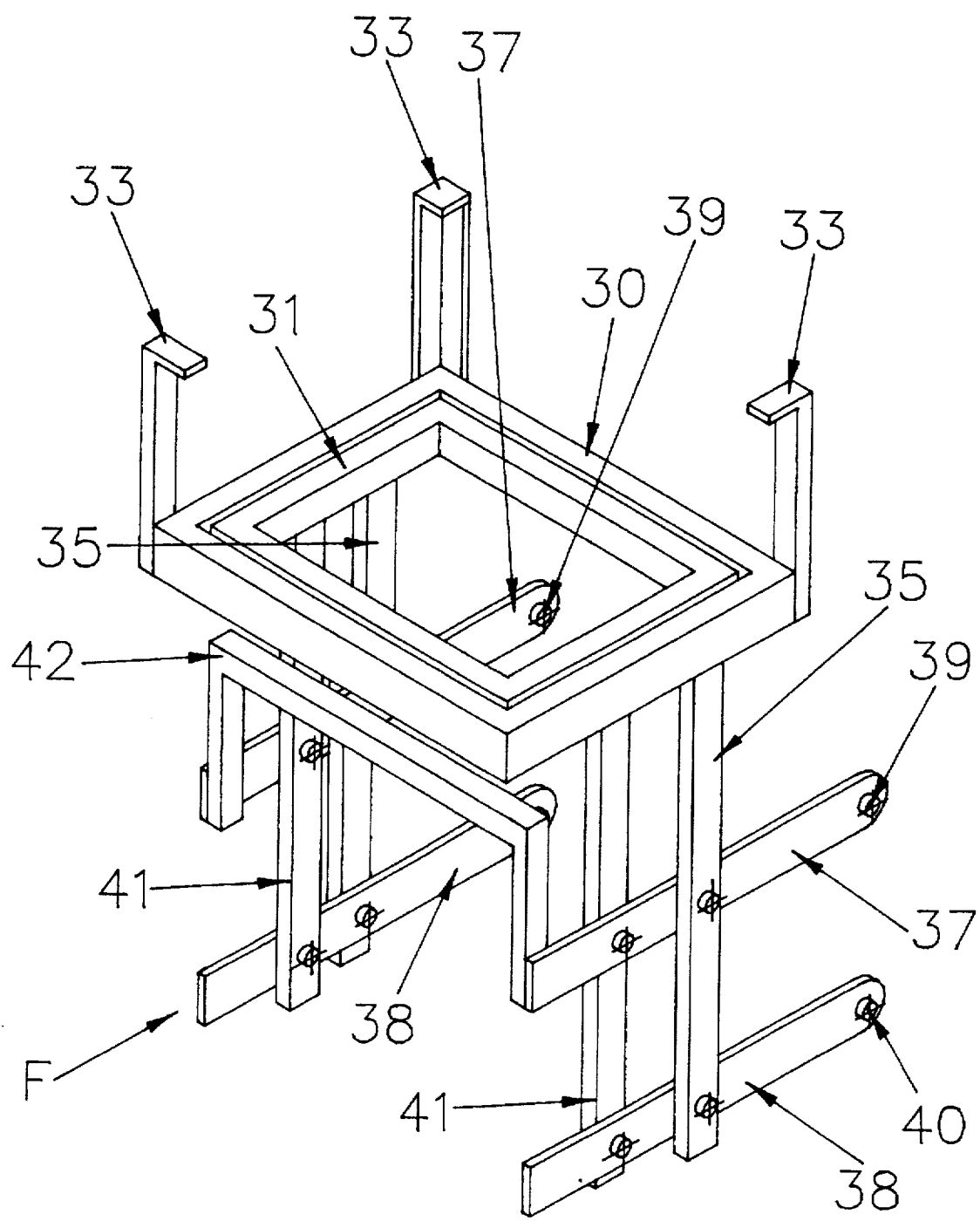
FIG. 5 is an isometric view of part of a second embodiment of the invention.

Referring to FIGS. 1–3, in a first embodiment of the invention, de-boxing apparatus 2 comprises a main support frame 3 upon which are mounted two movable platforms 4, 5 and a pneumatic cylinder 6. Air supply to the cylinder is controlled by a foot pedal (not shown).

The support frame 3 consists of a floor-mounted cross-bar 7, upon which the cylinder 6 is mounted, and a pair of spaced L-shaped side members 8 each of which extends vertically from the end of the cross-bar 7 and then horizontally back to a vertical stay 9. The frame 3 is secured to the honey processing apparatus (not shown) with which the de-boxer to be used.

The cylinder 6 extends vertically between the mid-point of the cross bar 7 and the mid-point of a second cross bar 10 which extends across an axis of the inner platform 5. The rod 11 of the cylinder 6 is secured to the cross bar 10 and the base of the cylinder 6 is secured to the cross bar 7.

The outer platform 4 comprises a rectangular, horizontal frame 12, which is dimensioned and proportioned to support the periphery of a honey frame box. These boxes are reasonably uniform in length and breadth, although the height varies as discussed hereinafter. Two adjacent sides of the frame 12 are fitted with a guide ledge 4a.

The frame 12 is mounted upon a pair of spaced vertical support tubes 13 each of which is mounted in a bearing 14 which is attached to the adjacent side member 8 by a bracket 15.

The lower end of each support tube 15 carries a bracket 16 to which is secured the lower end of a coil-spring 17.

The upper end of each spring 17 is secured to the underside of the inner platform 5. The platform 5 comprises a rectangular, horizontal frame 18 the exterior of which just fits within the interior of the frame 12. The frame 18 is mounted upon a pair of spaced vertical support tubes 19. Each tube 19 passes through a bearing 20 mounted upon the tube 13 by a bracket 21. A stop 22 is mounted at or adjacent the end of each tube 19. The position of the stop 22 along the tube 19 is adjustable.

A stop 23 in the form of a horizontal plate is mounted along the top of each support 9. The stops 23 project inwards along each side of the apparatus by an amount sufficient to overlap the outer platform 4 but not the inner platform 5.

Above each stop 23 and parallel thereto, is mounted a bracket 24. Each bracket is a plate pivotally mounted on the support and can pivot between the position shown in FIG. 1 and a position in which the plane of the plate is substantially vertical. The plate is spring-biased towards the position shown in FIG. 1. Handles 25 are mounted at the end of each bracket 2.4, so that the brackets can be moved manually if necessary.

The above-described apparatus is used as follows:- the cylinder 6 is bled to retract the rod 11 and lower both platforms 4 and 5 to their lowest level (FIG. 2). A box 27 full of honey frames 28 (both shown in broken lines in FIG. 1 only) is placed on the platforms 4 and 5; the guide ledges 4a around the platform 4 help to align the box correctly on the platforms. The box 27 is positioned so that the frames 28 extend lengthwise across the apparatus.

The foot-pedal of the cylinder 6 is then operated to extend the rod 11, which pushes the cross bar 10, and hence the platform 5, upwards.

The platform 4 moves upwards with the platform 5, pulled by the springs 17 connecting the two platforms. The platforms, box and frames move upwards until the upper side edges of the box contact the stops 23, preventing further upward movement of the box and the platform 4.

However, the platform 5 continues to rise, and so pushes the frames 28 out of the box and upwards to contact the underside of the brackets 24. The springs 17 extend to allow the platform 5 to rise above the platform 4.

As the lugs 28a of the frames 28 contact the brackets 24 from below, they pivot the brackets in the direction of arrows A, allowing the lugs 28a to pass above the brackets. The brackets then are moved back to the FIG. 1 position by their biassing springs, and the frames 28 fail back to rest with their lugs 28a on top of the brackets, as shown in FIG. 1.

The cylinder 6 is then bled to lower the platforms 4 and 5 until the box top is clear of the frames. The frames can then be moved (manually or automatically) onto further processing apparatus.

The above process is then repeated for the next box of flames.

The apparatus of this embodiment readily accommodates boxes and flames of different heights, because the platforms 4, 5 simply continue to rise together until the upper edge of the box contacts the stops 23, without any need to modify the apparatus. The amount of lift of the inner platform 5 is governed by the position of the stops 22 on the tubes 19, and this is easily adjusted by moving the stop up or down the tube and securing it by any suitable means in the desired position.

FIGS. 5-9 show a second embodiment of the invention. As in the first embodiment, the apparatus includes an outer platform 30 dimensioned to support the periphery of a honey frame box and an inner platform 31 dimensioned to fit inside the outer platform. Both platforms are horizontal. Also as in the first embodiment, the platforms are raised and lowered by a pneumatic cylinder 32 (not shown in FIG. 5) controlled by a foot-pedal (not shown).

The outer platform 30 comprises a rectangular frame with a vertical guide 33 secured to each of three corners, the frame being supported upon two supports 35 secured one to each side of the frame, off-centre of the side of the frame. Each support 35 is pivoted to two parallel cross-braces 37, 38 the outer ends of which are pivoted to a main support (not shown) at pivots 39, 40.

The inner platform 31 comprises a rectangular frame mounted upon two supports 41 secured one to each side of the frame, off-centre of the side of the frame. The supports 41 are pivoted to the cross-braces 37, 38.

The free ends of the cross-brace 37 are joined together by a yoke 42, to the mid-point of which the rod 43 of the cylinder 32 is secured via a brace 44 one end of which is pivoted to the rod 43 and the other end of which is rigidly secured to the mid-point of yoke 42.

Figure 6:
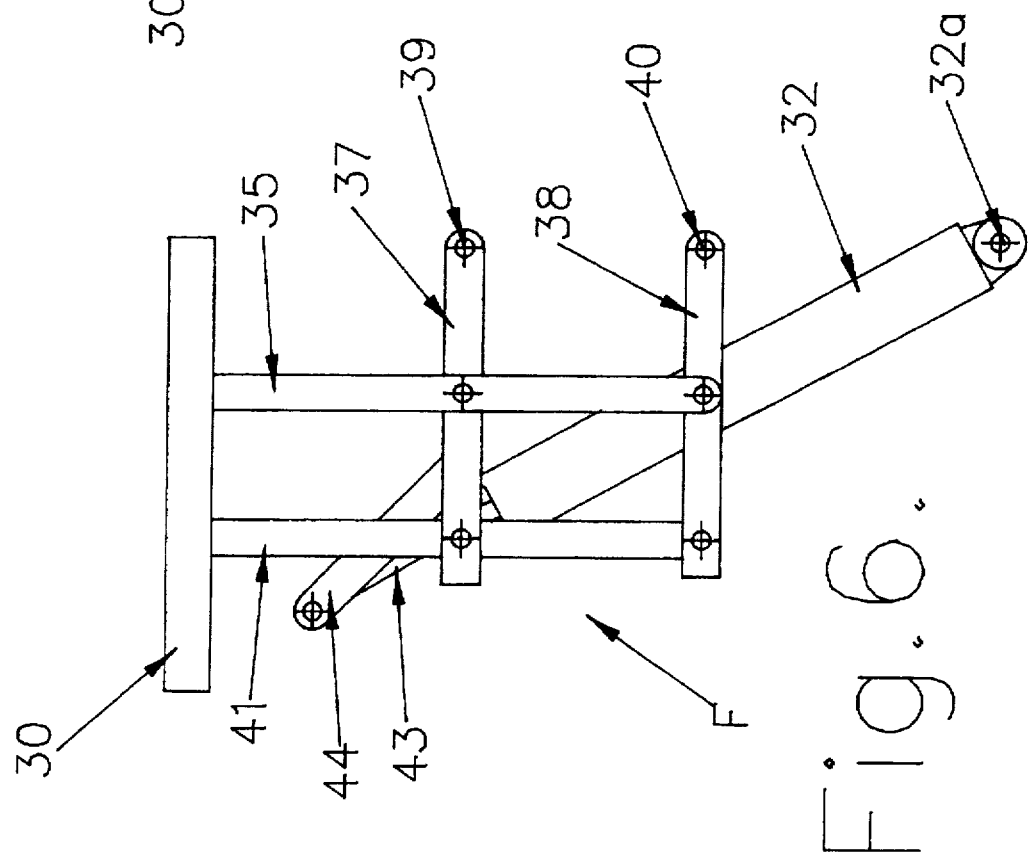
FIG. 6 is a side view of the apparatus of FIG. 5 in said first position.
Figure 8:
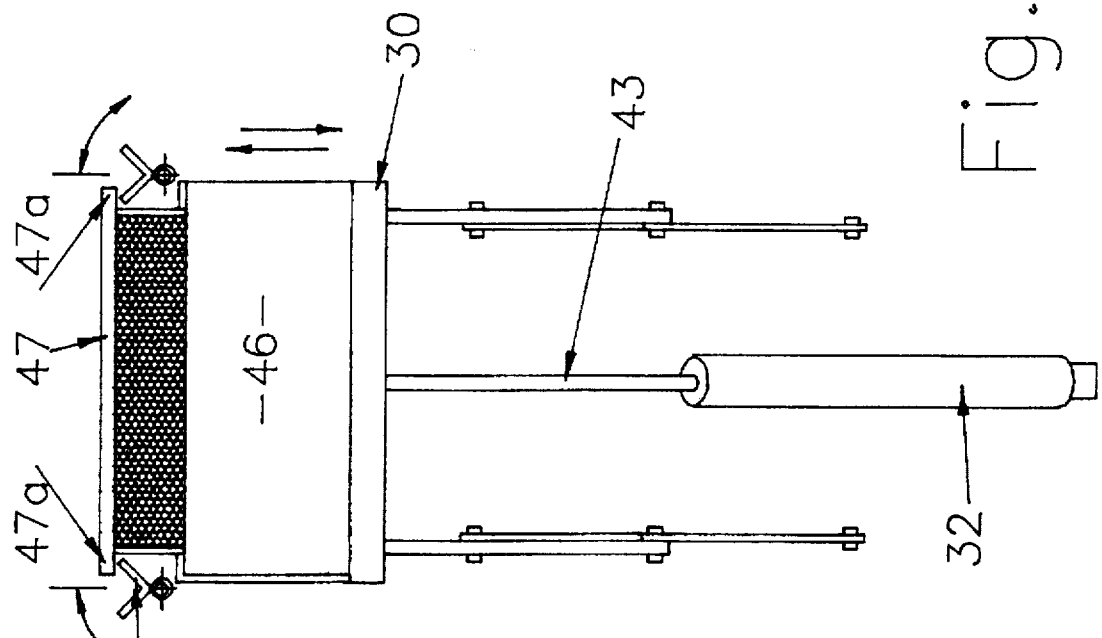
FIG. 8 is a front view of the apparatus of FIG. 6.
Figure 9:
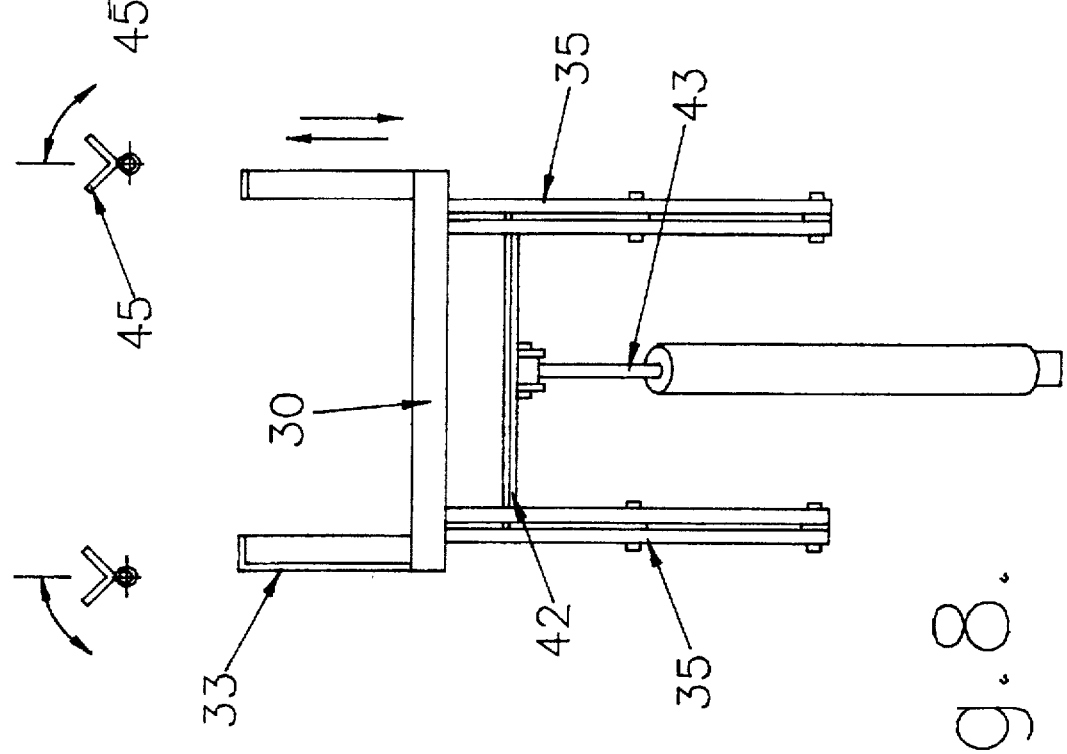
FIG. 9 is a front view of the apparatus of FIG. 7.

The above-described apparatus is used as follows:- a box 46 carrying honey frames 47 (FIG. 9 only) is placed on the platforms 30, 31 with the rod 43 of the cylinder 32 fully retracted (FIGS. 6 and 8). The operator then uses the foot-pedal to extend the rod 43, which raises the yoke 42 and hence pivots the supports 41 and 35. The supports 41 are secured closer to the front F of the apparatus (i.e. the position at which the operator stands) and the supports 35 are secured closer to the rear. The cylinder 32 is inclined, with its base pivoted at 32a at a location to the rear of the pivots 39, 40. Thus, the support system for the platforms 30, 31 effectively is a parallelogram-linkage.

Figure 7:
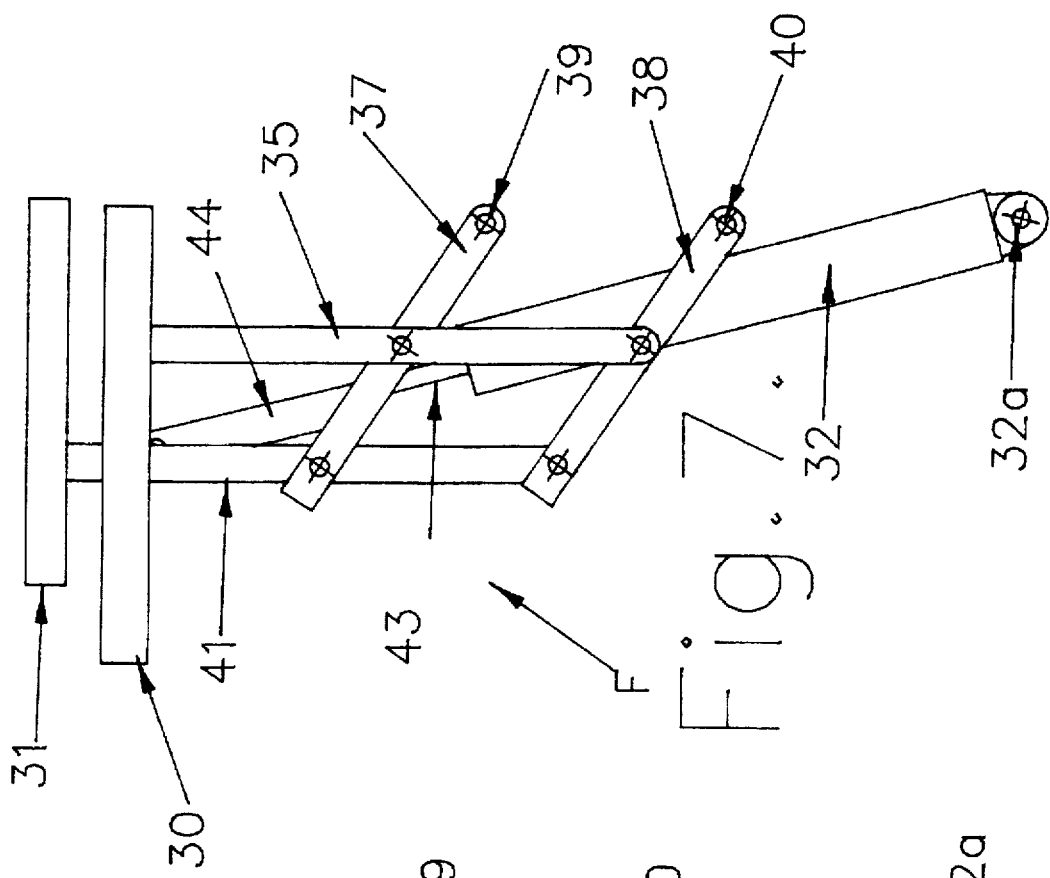
FIG. 7 is a side view of the apparatus of FIG. 5 in said second position.

It follows that, as the rod 43 is extended out of the cylinder 32, the inner platform 31 and the outer platform 30 both are raised, but the inner platform is raised more than the outer and also is pivoted somewhat towards the rear of the apparatus, as shown in FIG. 7. The effects of this is that the box 46 is raised on the outer platform 30, but the frames 47 within the box, which are raised by the platform 31, are lifted partially out of the box, to engage support plates 45 identical to those described with reference to the first embodiment. Once the frame lugs 47a have engaged the plates 45 and the frames are supported, the platforms 30, 31 are lowered by retracting the rod 43, and the empty box removed. The sequence is then repeated.

In the event that boxes of varying heights have to be accommodated, it is necessary to place a spacer frame upon the platform 30, to raise the height of the smaller boxes up to the height of the large boxes.

It will be appreciated that both of the above described embodiments have the advantage that the box and frames are lifted together for the first part of the lift, so that the frames remain contained and guided by the box until they are engaged with the supporting brackets.

In both embodiments, the pneumatic cylinder may be replaced by any suitable device e.g. hydraulic cylinder or reversible electric motor.

Also, the second platform may be a solid plate rather than a frame.

If it proves necessary to remove a set of frames from the brackets 24, 45, an empty box is placed on the platforms and the platforms raised as described above until the upper edges of the box surround the frames and the second platform lifts the frames off the brackets. The brackets are held out of the way manually to allow the frames to drop back into the box, which is then lowered.

We claim:

1. A de-boxing apparatus for honey frames, comprising: a first platform in the form of a frame dimensioned to support the lower periphery of a honey frame box; means for raising said platform from a first, lower position to a second raised position which is a predetermined distance below an in-feed level of a honey processing machine; means for pushing the honey frames upwards out of said box as the platform approaches or reaches said second position said means for pushing said honey frames out of said box comprising a second platform arranged to lie within the frame comprising the first platform at said first position and arranged to lie above the first platform when the first platform is at said second position; and support means arranged to receive and support said frames when said frames are removed from said box.

2. The apparatus as claimed in claim 1 wherein said means for raising said first platform comprises a lifting device connected to said second platform and elastic connecting means connecting said second platform to said first platform, such that upward movement of said second platform caused by said lifting device is transmitted to said first platform so as to raise said first platform with said second platform.

3. The apparatus as claimed in claim 2 further comprising stops positioned so as to prevent movement of said first platform above said second position; said elastic connecting means being sufficiently elastic to permit further upward movement of said second platform after said platforms have reached said second position.

4. The apparatus as claimed in claim 3 wherein said elastic connecting means comprises one or more coil springs.

5. The apparatus as claimed in claim 3 wherein said support means comprise a pair of pivoted plates spaced apart by a distance equal to the length of a honey frame, each said plate being arranged with the length of the plate perpendicular to the length of the honey frames and pivotally mounted so as to be freely pivotable between a first position in which the plane of the plate is substantially horizontal and a second position in which the plane of the plate is substantially vertical, the plate being biassed towards said first position.

6. The apparatus as claimed in claim 3 wherein said lifting device is selected from the group consisting of: a pneumatic cylinder, a hydraulic cylinder; a reversible electric motor.

7. The apparatus as claimed in claim 1 wherein said means for raising said first platform comprises a lifting device connected to said first and second platforms by a parallelogram linkage such that operation of said lifting device lifts both said first and second platforms but raises the second platform higher than the first platform by a predetermined amount.

8. The apparatus as claimed in claim 7 wherein said lifting device is selected from the group consisting of: a pneumatic cylinder, a hydraulic cylinder; a reversible electric motor.

9. The apparatus as claimed in claim 7 wherein said support means comprise a pair of pivoted plates spaced apart by a distance equal to the length of a honey frame, each of said plates being arranged with the length of the plate perpendicular to the length of the honey frames and pivotally mounted so as to be freely pivotable between a first position in which the plane of the plate is substantially horizontal and a second position in which the plane of the plate is substantially vertical, the plate being biassed towards said first position.

* * * * *

UNITED STATES PATENT AND TRADEMARK OFFICE
CERTIFICATE OF CORRECTION

PATENT NO. : 5,685,762
DATED : November 11, 1997
INVENTOR(S) : Penrose et al.

It is certified that error appears in the above-indentified patent and that said Letters Patent is hereby corrected as shown below:

Column 1, line 8, change "flames" to --frames--;
        line 24, change "flames" to --frames--;
        line 43, change "Beats" to --Beals--.

Column 2, line 6, after "position" insert --,-- (a comma).

Column 3, line 17, change "2.4." to --24,--;
        line 44, change "fail" to --fall--;
        line 52, change "flames" to --frames--;
        line 55, change "flames" to --frames--.

Signed and Sealed this

Eleventh Day of August 1998

*Attest:*

BRUCE LEHMAN

*Attesting Officer*      *Commissioner of Patents and Trademarks*